United States Patent
Chung

(10) Patent No.: US 8,263,034 B2
(45) Date of Patent: Sep. 11, 2012

(54) NITROGEN-RICH WASTE WATER TREATMENT METHOD AND METHOD FOR PRODUCING STRUVITE

(75) Inventor: In Chung, Seoul (KR)

(73) Assignee: Entechs Co., Seoul (KR)

( * ) Notice: Subject to any disclaimer, the term of this patent is extended or adjusted under 35 U.S.C. 154(b) by 108 days.

(21) Appl. No.: 12/867,116

(22) PCT Filed: Feb. 11, 2009

(86) PCT No.: PCT/KR2009/000635
§ 371 (c)(1),
(2), (4) Date: Aug. 11, 2010

(87) PCT Pub. No.: WO2009/102142
PCT Pub. Date: Aug. 20, 2009

(65) Prior Publication Data
US 2010/0322839 A1    Dec. 23, 2010

(30) Foreign Application Priority Data

Feb. 11, 2008 (KR) .................. 10-2008-0012092
Jan. 29, 2009 (KR) .................. 10-2009-0007129
Feb. 10, 2009 (KR) .................. 10-2009-0010553

(51) Int. Cl.
*C01B 25/26* (2006.01)
*C01B 25/28* (2006.01)
*C01B 25/34* (2006.01)
*C01B 25/45* (2006.01)

(52) U.S. Cl. ........................ 423/302; 423/306
(58) Field of Classification Search .............. 423/302, 423/306
See application file for complete search history.

(56) References Cited

U.S. PATENT DOCUMENTS

| | | | |
|---|---|---|---|
| 4,389,317 A | 6/1983 | Trentelman et al. | |
| 7,842,186 B2 * | 11/2010 | Chung et al. | 210/603 |
| 2010/0322839 A1 * | 12/2010 | Chung | 423/302 |

FOREIGN PATENT DOCUMENTS

| | | |
|---|---|---|
| DE | 37 32 896 A1 | 8/1988 |
| DE | 44 34 414 A1 | 3/1996 |
| EP | 0 335 280 A1 | 10/1989 |
| EP | 0 363 612 A1 | 4/1990 |
| EP | 0 564 298 A1 | 10/1993 |
| JP | 11-267665 A | 10/1999 |
| JP | 2002336875 A | 11/2002 |
| KR | 2000-0019613 A | 4/2000 |
| KR | 2002-0005521 A | 1/2002 |
| KR | 2004-0070408 A | 8/2004 |
| KR | 2008-0004441 A | 1/2008 |

OTHER PUBLICATIONS

International Search Report and Written Opinion for Application No. PCT/KR2009/000635 mailed Aug. 16, 2010.
Supplementary European Search Report for Application No. EP 09 71 1214 dated Oct. 31, 2011.
Maqueda, C. et al., *Study of Struvite Precipitation in Anaerobic Digesters*, 2406 Water Research Feb. 28, 1994, No. 2, Head.Hill Hall, Oxford, GB.

* cited by examiner

*Primary Examiner* — Timothy Vanoy
(74) *Attorney, Agent, or Firm* — Alston & Bird LLP

(57) ABSTRACT

The present invention relates to an efficient method of removing nitrogen and producing struvite from nitrogen-rich wastewater. Additionally, the present invention provides an economical method of removing nitrogen while producing a large quantity of struvite from nitrogen-rich wastewater with an appropriate usage of a solution containing phosphorus ion and a solution containing magnesium ion and/or calcium ion.

17 Claims, No Drawings

NITROGEN-RICH WASTE WATER TREATMENT METHOD AND METHOD FOR PRODUCING STRUVITE

CROSS REFERENCE TO RELATED APPLICATIONS

This application claims priority to PCT Application No. PCT/KR2009/000635 filed on Feb. 11, 2009, which claims the benefit of Korean Patent Application No. 10-2008-0012092 filed on Feb. 11, 2008, Korean Patent Application No. 10-2009-0007129 filed on Jan. 29, 2009, and Korean Patent Application No. 10-2009-0010553 filed on Feb. 10, 2009, all of which are incorporated by reference herein in their entirety.

BACKGROUND OF THE INVENTION (a) Field of the Invention

The present invention relates to an economical method of removing nitrogen and producing a large quantity of struvite from nitrogen-rich wastewater.

(b) Description of the Related Art

There are many existing biological and physical-chemical methods for removing phosphorus and nitrogen and these methods have drawbacks such as difficulties in maintaining the removal efficiency while being costly as well. Recently, the research of simultaneous removal of nitrogen and phosphorus through production of struvite (magnesium ammonium phosphate, MAP) has been actively pursued. Pure MAP is composed of magnesium ion, ammonium nitrogen, and phosphate in a mole ratio of 1:1:1, reciprocally. The reaction formula is:

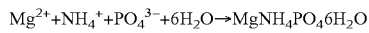

$$Mg^{2+}+NH_4^++PO_4^{3-}+6H_2O \rightarrow MgNH_4PO_4 6H_2O$$

Additionally, MAP analogs such as Calcium Ammonium Phosphate, in which magnesium ion is substituted by calcium ion, may be produced and MAP and MAP analogs are called as struvite. Removal of phosphorus and nitrogen from wastewater by the form of struvite can effectively eliminate phosphorus and nitrogen simultaneously and struvite is a slow-release fertilizer that is non-toxic and has a lasting effect without being easily oxidized over a long period of usage.

The technologies of struvite formation include:
- Tsunekawa et al., Abstracts of Japanese Patent No. 11-267665
- Trentelman, U.S. Pat. No. 4,389,317
- Korea Patent No. 2002-0005521
- Korea Patent No. 2000-0019613
- Korea Patent No. 2004-0070408
- Korea Patent No. 2007-0135309

However, in the instance of these previous methods, a considerable amount of expenses are required for supplementing magnesium, calcium and phosphorus chemicals when treating nitrogen-rich wastewater with a low concentration of magnesium, calcium, and phosphorus ions. As a result, struvite production is limited and a large quantity of ammonium nitrogen remains. There is yet to be a technique that is prepared to compensate such short comings. In other words, there is not a technique or patent that cost-efficiently supplies magnesium, calcium, and phosphorus ions in order to additionally remove nitrogen from nitrogen-rich wastewater while economically increasing struvite production.

SUMMARY OF THE INVENTION

The object of the present invention is to provide an economical method of removing nitrogen and producing a large quantity of struvite from nitrogen-rich wastewater by inexpensively supplementing a solution with dissolved phosphorus ion.

To achieve the object, the present invention provides a method of treating nitrogen-rich wastewater and producing struvite, comprising the steps of:

(a) anaerobic treatment step treating the wastewater and a first solution containing phosphorus ion with anaerobic microorganisms in anaerobic reactor; and (b) struvite formation step introducing the treated wastewater of step (a) into a struvite reactor and producing struvite.

The method of treating wastewater may further comprise the addition of the second solution containing at least one alkali metal-containing solution selected from the group consisting of magnesium-containing solution, calcium-containing solution, and a mixture thereof, into step (a) or (b).

Also, the method of treating wastewater may comprise the second solution being added to the anaerobic reactor of step (a), in alone or a mixture with the first solution containing phosphorus ion.

Also, the method of treating wastewater may comprise the second solution being added with the treated wastewater of step (a) into the struvite reactor of step (b).

DETAILED DESCRIPTION OF THE EMBODIMENTS

The following detailed description will subsequently explain the present invention.

The present invention relate to the treatment method of nitrogen-rich wastewater, with a higher content of nitrogen than magnesium, calcium and phosphorus ions, as well as the formation of struvite.

The distinguishing characteristic of the present invention is the simultaneous introduction of phosphorus ion-containing the first solution with the wastewater into the anaerobic reactor instead of a direct input of the wastewater alone when treating the wastewater. Most hitherto methods use phosphorus ion-containing solutions with a low pH in order to form struvite. When using the first solution for the formation of struvite as in such methods, the pH is lowered and requires the usage of an increased amount of alkaline solution. However, the present invention injects the first solution before the anaerobic treatment of the wastewater so that the pH of the outflow is controlled to be of 6.8~8.0 regardless of the nature of the inflow during the anaerobic processing. Accordingly, the present invention has the advantage of using a decreased amount of alkaline solution compared to previous methods and of minimizing side reactions such as the production of $Mg_3(PO_4)_2$ from the reaction of phosphorus phosphate and magnesium.

Also, the present invention may include the step of returning the processed wastewater removed of ammonium nitrogen by the procedure to the anaerobic reactor. Prevention of ammonia toxicity which complicates all anaerobic reactors and mass-production of struvite becomes possible through this.

The present invention is composed of (a) anaerobic treatment of wastewater with phosphorus ion-containing the first solution and (b) formation of struvite.

More specifically, the method of the present invention includes the steps of: (a) anaerobic treatment step treating the wastewater and the first solution containing phosphorus ion with anaerobic microorganisms in anaerobic reactor; and (b) struvite formation step introducing the treated wastewater of step (a) into a struvite reactor and producing struvite, Also, the method of the present invention may further comprise the addition of second solution containing at least one alkali metal-containing solution selected from the group consisting of magnesium-containing solution, calcium-containing solution, and a mixture thereof, into step (a) or (b).

In addition, step (b) further comprises a step of adjusting pH to 8 or higher by adding a base. The base may be used NaOH, KOH and the like as a general alkali agent and the base is not particularly limited in the present invention.

The following will explain preferred embodiments of the present invention more specifically.

According to one embodiment of the present invention, the method of the present invention includes the steps of: (a) anaerobic treatment step treating the wastewater and the first solution containing phosphorus ion with anaerobic microorganisms; and (b) formation of struvite by simultaneously introducing the treated wastewater of (a) and the second solution containing at least one alkali metal-containing solution selected from the group consisting of magnesium-containing solution, calcium-containing solution, and a mixture thereof into the struvite reactor.

Step (a) is a characteristic anaerobic treatment step of the present invention that treats the nitrogen-rich wastewater and phosphorus ion-containing the first solution together and discharges anaerobically treated water.

In this instance, the direct usage of the first solution for the formation of struvite is not cost-efficient due to the large quantity of the alkaline solution that is required to create the appropriate condition (pH 9~9.2) for struvite formation, which is because of the low pH of the first solution.

Therefore, the present invention performs the step of injecting the first solution along with the nitrogen-rich wastewater, which is the subject of the treatment, into the anaerobic reactor thereby promoting decomposition of organic substances into methane and carbon dioxide and conversion of considerable amounts of organic nitrogen into ammonium nitrogen by anaerobic microorganisms.

A solution with phosphorus phosphate, manufactured from the catalytic reaction of a certain concentration of phosphatic aqueous solution or a compound composed of both phosphate and calcium with acid, and large contents of calcium may be used as the first solution. For the present invention, the manufacturing of phosphorus ion-containing the first solution may be done without difficulty. Depending on the type of acid, it may take only 5 minutes of contact for the dissolution of phosphorus ion.

For the compound comprised of both phosphorus phosphate and calcium, may be used at least one selected from the group consisting of MCP (monocalcium phosphate), DCP (dicalcium phosphate), TCP (tricalcium phosphate) and any variety of animal bones.

For the animal bones, the bones of a cow, pig, lamb, chicken, horse, duck, camel, deer, dog, rabbit, etc. can be used and there are no particular restrictions to the type of bone.

Also, for the first solution, solutions produced from shellfish cover dissolved in water or acid may be further included.

The first solution of this present invention may be a solution additionally supplemented with magnesium or calcium-containing solution.

In this instance, possible choices of acids include any purchasable acid such as waste acid and low grade acid generated from industrial fields: nitric acid, hydrochloric acid, sulfuric acid, phosphoric acid, acetic acid, and other organic acids, etc. Also, the fermented acid of organic wastes, including food waste, may be used. For example, food waste may be acidified and used as fermented acid with a pH of 1.5~5.5 for the present invention.

When using the fermented acid, it is possible to simultaneously proceed with the acidification and the dissolution of the ingredient compounds for the first solution by additionally injecting phosphate along with organic matters into the acidification reactor. Namely, there is the advantage of reduced costs in purchase and transport of acid wastes because of the dissolution of ions due to the reaction between ingredient compounds and fermented acid produced during the acidification of food waste, piggery waste, etc.

The nitrogen-rich wastewater may include wastewater with a higher content of nitrogen compared to magnesium, calcium, and phosphate such as sewage, livestock waste, landfill leachate, food waste, leachate of food waste, sewage sludge, and particular industrial wastewaters such as distillery wastewater, pharmaceutical wastewater, brewery wastewater.

Preferably, whichever choice from livestock waste with a total nitrogen concentration of 1500~4500 mg/L, landfill leachate with a total nitrogen concentration of 1000~4500 mg/L, leachate of food waste with a total nitrogen concentration of 2500~6500 mg/L, sewage with a total nitrogen concentration of 25~150 mg/L, and from the group of particular industrial wastewaters such as distillery wastewater, pharmaceutical wastewater, brewery wastewater with a total nitrogen concentration of 800~2500 mg/L may be used for the nitrogen-rich wastewater.

Also, even if the incoming water has a low pH, the anaerobically treated water can maintain a pH of 6.8~8.2 due to the dissolution of carbon dioxide that is produced during the anaerobic treatment step within the anaerobic reactor. Therefore, by going through the anaerobic treatment step, the advantage of requiring minimal injection of alkaline solution in order to create an appropriate condition (pH 9.0~9.2) for the formation of struvite exists.

For the anaerobic reactor, all currently-operated anaerobic reactors such as digester, anaerobic contact process, fluidized bed reactor, anaerobic filter, hybrid anaerobic reactor, and UASB group reactors that use granules formed of microorganisms (UASB (upflow anaerobic sludge blanket), EGSB (extended granule sludge bed), and IC (internal circulation)) are applicable.

Also, various engineering methods and other patented engineering methods may all be used for the formation of struvite in the above-mentioned step (b).

Preferably, the struvite formation step of the present invention includes the steps of producing struvite by injecting the second solution, manufactured by dissolving at least one selected from the group of magnesium and calcium-containing solution in the acid, into the anaerobically treated water, and appropriately increasing the pH.

The above-mentioned second solution may be introduced into the struvite reactor via a separately installed equipment.

It is possible to use commonly used substances for the magnesium-containing solution: aqueous solutions such as $MgCl_2$, $Mg(OH)_2$, etc.

It is possible to use commonly used substances for the calcium-containing solution: aqueous solutions such as $CaCl_2$, $Ca(OH)_2$, etc.

Additionally, the optimum ratio of elements of the produced crystallized struvite in the above-mentioned step (b) is possible through the appropriate regulation of mol ratio of ammonia that can be removed. For instance, a mol ratio for $Ca/Mg:NH_4^+:PO_4^{3-}$ of 1.2~4.0:1:1.1~2.0 is a preferable and a mol ratio of 3:1:1.5 is ideal.

In other words, depending on the mol ratio of ammonia intended to be removed, the first solution and second solution can be adequately supplemented accordingly and there are no specific limitations to the amount of their usage in the case of the present invention.

Furthermore, the step of removing solids from the wastewater may be included before or after the anaerobic treatment in the method of the present invention. In other words, the solid-liquid separation may be additionally performed in this present invention after the anaerobic process and before the struvite formation step. Physical methods, chemical methods, or a mixture thereof may be utilized for the solid-liquid separation step. That is to say that the above-mentioned solid-liquid separation step can be carried out by using physical treatments such as a decanter that employs the difference in specific gravity or microbubbles or applied artificial gravity, a precipitation tank, an inclined plate settler, a dissolved air flotation tank, etc.; chemical treatments that use chemicals to alter the specific gravity; or a combination of these methods.

The above-mentioned method may include the procedure of maintaining a low concentration of ammonium nitrogen within the anaerobic reactor by re-circulating the treated water obtained from step (b), removed of ammonium nitrogen, into the anaerobic reactor. Through this process, the present invention obtains the advantage of additionally removing nitrogen and producing struvite.

According to another embodiment of the present invention, the present invention may include the steps of: (a) anaerobic treatment step treating the wastewater by introducing the wastewater and (i) the first solution containing phosphorus ion and (ii) the second solution containing at least one alkali metal-containing solution selected from the group consisting of magnesium-containing solution, calcium-containing solution, and a mixture thereof with anaerobic microorganisms into the anaerobic reactor; and (b) struvite formation step introducing the treated wastewater of step (a) into the struvite reactor.

That is, the present invention may include the steps of the injection of both the first solution and second solution, which are necessary for the formation of struvite, before the anaerobic treatment into the anaerobic reactor; the anaerobic processing; and the formation of struvite. In this instance, the struvite formation step may include the process of providing the condition to increase the pH for the formation of struvite without additionally injecting the second solution.

In this instance, another embodiment of the present invention may be executed under the same conditions of one embodiment mentioned above, except the combined usage of the first solution and second solution in the step (a).

Also, as is mentioned above, the second solution may be separately or simultaneously injected with phosphorus ion-containing the first solution into the anaerobic reactor.

Through this step, the present invention is able to convert a considerable amount of organic nitrogen into ammonium nitrogen by the decomposition generated by the anaerobic microorganisms of organic matters in the nitrogen-rich wastewater.

Step (b) includes the process of struvite formation by introducing the anaerobically treated water into the struvite reactor. Also, step (b) may further include the process of adding a base as general alkali agent such as NaOH, KOH in order to adjust the pH to 8 or higher.

The same methods of manufacturing the first solution and second solution for one embodiment mentioned above may be applied here and therefore, further details on this will be omitted. Also, the conditions for the usage of the anaerobic reactor for the processing of wastewater are the same as well.

Also, it is possible to set aside a certain amount of phosphorus phosphate after removing ammonium nitrogen from the wastewater and to reuse it for wastewater treatment in this present invention.

As mentioned above, according to the present invention, it is possible to economically remove nitrogen while economically producing a large quantity of struvite through the formation of struvite from the processed water after treating nitrogen-rich wastewater with the inexpensively-manufactured phosphorus ion-containing the first solution and anaerobic processing.

For this reason, the method of the present invention, compared to the current methods of producing struvite by anaerobic treatment of wastewater without the first solution of the present invention, has the advantages of an improvement in nitrogen elimination efficiency, a consequential decrease in the nitrogen concentration of the discharged water and an economized increase in struvite production.

The present invention allows the minimal usage of alkaline solution while removing a large amount of nitrogen and increasing the output of struvite by producing struvite with the supplement of Mg/Ca ion-containing solution into the anaerobically treated mixture of nitrogen-rich wastewater and phosphorus ion-containing solution.

The composition the present invention will be further evident and the effects of the present invention will be demonstrated by reference to the following examples. These examples, however, should not be interpreted as limiting the scope of the present invention in any manner.

EXAMPLE

Example 1

After collecting discharged effluent from a thermophilic digester that treats distillery wastewater, it was seeded into a mesophilic anaerobic digester with a service capacity of 100 L and 5 L/d of the raw distillery wastewater was injected to this mesophilic anaerobic digester. After operating the mesophilic anaerobic digester, a struvite manufacturing facility with arrangements for aeration and supplement of NaOH and magnesium ion in the latter part of the digester was installed to produce struvite from the anaerobically treated wastewater and struvite removed wastewater was analyzed. In order to increase the concentration of magnesium ion to 432 mg/L (18 mmole/L), a magnesium-containing chemical was injected. To maintain the pH of the struvite manufacturing facility discharged water at 8.8~9.0, NaOH was injected. The experiment was operated for 4 weeks and the analyzed average results of the last week are shown in the table below. The distillery wastewater was categorized into 'before anaerobic treatment', 'after anaerobic treatment' (effluent from the anaerobic wastewater processing step), and 'after separation of crystals' (effluent from struvite manufacturing step).

After the completion of the above test, a 76% phosphoric acid solution (hereinafter, the first solution) was chosen and introduced at 0.1 kg/d of phosphoric acid along with the raw wastewater. After one month since the start of the operation, the analyzed results of the following month are shown in the table 1 below as 'after supplementation of the first solution'. The first solution of this present experiment contains only phosphate and no calcium or magnesium ions.

TABLE 1

| Items | Before Anaerobic Treatment | Before Supplementation of the first solution | | After Supplementation of the first solution | |
|---|---|---|---|---|---|
| | | After Anaerobic Treatment | After Separation of Crystals | After Anaerobic Treatment | After Separation of Crystals |
| CODcr[mg/L] | 51,000 | 14,000 | 12,250 | 14,200 | 10,200 |
| T-N[mg/L] | 1,800 | 1,450 | 1,210 | 1,460 | 1,110 |
| $NH_4$—N[mg/L] | 250 | 890 | 808 | 890 | 111 |
| $PO_4$—P[mg/L] | 256 | 250 | 2.1 | 480 | 68 |

As shown in the results of table 1 above, when using the current methods of struvite formation without the supplementation of phosphorus-dissolved the first solution, supplying 18 mmole/L of magnesium ion resulted in removal of 8.0 mmole/L of phosphorus phosphate and 5.86 mmole/L of ammonium nitrogen, leaving 808 mg/L of ammonium nitrogen.

However, if the first solution which supplies phosphorus phosphate was supplied before the anaerobic treatment, the ammonium nitrogen concentration would be decreased to 777 mg/L, and thus it would result in an additional decrease in ammonium nitrogen concentration of 31 mg/L compared to the 808 mg/L. The output of struvite was also increased to a 3.0 g/d from 1.9 g/d (an approximate 1.5 fold increase). 13.3 mmole/L of phosphorus phosphate was eliminated while 68 mg/L remained. This is thought to be because of the lack of magnesium or calcium.

Example 2

After completing the experiment of Example 1, a new the first solution with both calcium and phosphorus was manufactured by dissolving 4 kg of pig bones and 2 kg of oyster shells in 20 L of acetic acid with a pH of 2.2 for 15 days and was analyzed in order to supply the same amount of phosphorus phosphate. The calcium/phosphorus-containing the first solution was supplied at a rate of 0.4 L/d along with raw wastewater into the anaerobic reactor. After one month since the start of the operation, the analyzed results of the following week are shown in the table 2 below as 'after supplementation of calcium/phosphorus-containing the first solution'.

TABLE 2

| Items | Before Anaerobic Treatment | After supplementation of the first solution (Phosphate) | | After Supplementation of Calcium/Phosphorus-containing the first solution' | |
|---|---|---|---|---|---|
| | | After Anaerobic Treatment | After Separation of Crystals | After Anaerobic Treatment | After Separation of Crystals |
| CODcr[mg/L] | 51,000 | 14,200 | 10,200 | 13,900 | 9,099 |
| T-N[mg/L] | 1,800 | 1,460 | 1,110 | 1,450 | 1,020 |
| $NH_4$—N[mg/L] | 250 | 890 | 111 | 890 | 699 |
| $PO_4$—P[mg/L] | 256 | 480 | 68 | 488 | 2.3 |

Although the same amount of phosphate ion was supplied, the use of new the first solution supplies not only phosphate but also calcium instead of supplying phosphate singularly. Consequently, an extra 78 mg/L of ammonium nitrogen was eliminated resulting in a concentration of 699 mg/L and the concentration of phosphorus phosphate was 2.3 mg/L. In other words, it can be efficient to use the first solution with the addition of calcium or magnesium ions along with phosphorus phosphate.

Example 3

After completing the experiment of Example 2, an experiment comparing the struvite formation with and without elimination of suspended solids (SS) was executed while maintaining the same conditions of the experiment of Example 2. The experiment was done by introducing the SS removed water into the struvite facility while supplying NaOH and magnesium.

TABLE 3

| Items | Before Anaerobic Treatment | Without Elimination of Suspended solids | | After Elimination of Suspended solids | |
|---|---|---|---|---|---|
| | | After anaerobic Treatment | After Separation of Crystals | After Anaerobic Treatment | After Separation of Crystals |
| CODcr[mg/L] | 51,000 | 13,900 | 9,099 | 13,900 | 8,012 |
| T-N[mg/L] | 1,800 | 1,450 | 1,020 | 1,450 | 1,020 |
| $NH_4$—N[mg/L] | 250 | 890 | 699 | 894 | 723 |
| $PO_4$—P[mg/L] | 256 | 488 | 2.3 | 258 | 0.9 |

Although the elimination rate of ammonium nitrogen was slightly decreased (most likely due to the chemicals used for removal of phosphorus phosphate) there were no significant difficulties in either the nitrogen removal rate or the struvite formation rate. An improvement in the method of chemical treatment or the usage of a SS separation method that does not require chemical treatment could reduce this minimal decrease in the elimination rate of nitrogen. Therefore, the method of removing SS before or after anaerobic treatment can be regarded as a possible process in the elimination of nitrogen and formation of struvite.

Example 4

An upflow anaerobic digester with a service capacity of 22 $m^3$ and a height of 4 m followed by struvite reactor equipped with an apparatus for supplying NaOH and magnesium ion and an aeration installment was used to treat 600 L/d of livestock waste without removal of suspended solids for the struvite formation experiment. By not eliminating struvite during the trial run, the concentration of ammonium nitrogen in the digester reached 3,280 mg/L after 3 months. Due to the toxicity of ammonia, there were a 40~50% decrease in the elimination efficiency of organic matters and a decrease in biogas production rate from a 24 times the influent rate at the early stage to a 14 times the influent rate. The biogas production rate of 24 times the influent rate implies an 85% organic removal efficiency when treating piggery waste with a 60,000 mgCOD/L. This high removal efficiency is only possible during the early stage of the trial run, when ammonia is not accumulated.

Under these conditions, the ammonia concentration of the anaerobic reactor was reduced to a 500 mg/L by re-circulating N-removed effluent at a rate of 700% of the influent that was obtained after struvite formation by supplying a large quantity of phosphorus phosphate-supplying the first solution before anaerobic treatment and a large quantity of magnesium-containing the second solution after anaerobic treatment. During this process, an enormous amount of struvite was produced. As shown in the table below, there were an increase in the biogas production rate due to the enhanced activity of microorganisms now uninhibited by the toxicity of ammonium and a decrease in the COD of the discharged water.

TABLE 4

| | | Toxicity of Ammonia | | |
|---|---|---|---|---|
| Items | Raw wastewater | 100% | 50% | w/o toxicity |
| CODcr [mg/L] | 61,000 | 31,000 | 19,000 | 9,150 |
| Organic Removal [%] | | 49.2 | 68.9 | 85 |
| T-N [mg/L] | 3,800 | 3,670 | 1,980 | 700 |
| $NH_4$—N [mg/L] | 2,250 | 3,180 | 1,500 | 500 |
| Biogas Production[$m^3$/d] | | 8.4 | 10.8 | 14.4 |
| Biogas/Influent [times] | | 14 | 18 | 24 |

As shown in the results of table 4, the ammonium nitrogen concentration of the digester was reduced by re-circulating the treated water ridden of ammonium nitrogen. This resulted in the increase of production of biogas and a noticeable enhancement in the effluent quality and quantity of organic matter converted to biogas.

Example 5

After collecting discharged effluent from a thermophilic digester that treats distillery wastewater, it was seeded into a mesophilic digester with a service capacity of 100 L and 5 L/d of the raw distillery wastewater was injected to this mesophilic digester. After this mesophilic digester, a struvite manufacturing facility with arrangements for aeration and supplement of NaOH and magnesium ion was installed to produce struvite from the anaerobically treated wastewater and struvite removed wastewater was analyzed. Without providing the second solution, NaOH was injected to maintain the pH of the struvite manufacturing facility discharged water at 8.8~9.0. This resulted in a change in phosphorus phosphate concentration from 250 mg/L to 222 mg/L due to the removal of 0.9 mmole/L and a change in ammonium nitrogen concentration from 890 mg/L to 882 mg/L due to the removal of 0.57 mmole/L. This is thought to be because of the insufficient amount of magnesium and calcium compared to the relatively ample phosphorus phosphate in the raw wastewater and treated water.

In order to increase the magnesium ion concentration by a 384 mg/L (16 mmole/L), a magnesium-containing solution was introduced with the raw wastewater into the digester. After removing the organic matters in the digester, the digester effluent was treated in the struvite manufacturing facility. Under these conditions, the experiment was operated for 4 weeks and the analyzed average results of the last week are shown in the table below. The original distillery wastewater was categorized into 'before anaerobic treatment', 'after anaerobic treatment' (effluent from the anaerobic wastewater processing step), and 'after separation of crystals' (effluent from struvite manufacturing step). As a result of the sufficient augmentation of magnesium-containing compounds into the digester, the concentration of phosphorus phosphate became 2.1 mg/L from 250 mg/L while 8.0 mmole/L of phosphorus phosphate was removed. The additional 4.79 mmole/L elimination of nitrogen and a consequential discharge at a concentration of 815 mg/L were also observed.

TABLE 5

| | | Before Supplementation of the second solution into Digester | | After Supplementation of the second solution into Digester | |
|---|---|---|---|---|---|
| Items | Before Anaerobic Treatment | After Anaerobic Treatment | After Separation of Crystals | After Anaerobic Treatment | After Separation of Crystals |
| CODcr[mg/L] | 51,000 | 14,000 | 12,250 | 14,200 | 10,200 |
| T-N[mg/L] | 1,800 | 1,450 | 1,210 | 1,460 | 1,110 |
| $NH_4$—N[mg/L] | 250 | 890 | 882 | 890 | 815 |
| $PO_4$—P[mg/L] | 256 | 250 | 222 | 250 | 2.1 |

Example 6

After completing the experiment of Example 5, a comparison of injection methods of magnesium-containing the second solution was done by supplying the second solution into the struvite manufacturing facility without supplying the second solution into the digester. The results of this change in the second solution injection methods are shown in the table 6 below. Comparing the operation results of the change of injection methods for a week, a nearly identical outcome was obtained as seen in table 6. However, a more elimination of nitrogen was impossible in both cases because phosphorus phosphate was insufficient.

TABLE 6

| Items | raw waste-water | Before Supplementation of the second solution into Digester | | After Supplementation of the second solution into Digester | |
|---|---|---|---|---|---|
| | | After Anaerobic Treatment | After Separation of Crystals | After Anaerobic Treatment | After Separation of Crystals |
| CODcr[mg/L] | 51,000 | 14,200 | 10,200 | 14,200 | 10,300 |
| T-N[mg/L] | 1,800 | 1,460 | 1,110 | 1,460 | 1,130 |
| $NH_4$—N[mg/L] | 250 | 890 | 815 | 890 | 814 |
| $PO_4$—P[mg/L] | 256 | 250 | 2.1 | 250 | 2.1 |

Example 7

After completing the experiment of Example 6, an attempt for mass-removal of nitrogen was carried out by simultaneously supplying 73 mmole/L of phosphate in the form of a 76% phosphate solution as the first solution and magnesium ion-containing the second solution. In the present experiment, the first solution contains only phosphorus and is devoid of calcium or magnesium ions and the total amount of the second solution is 160 mmole/L. 75% of the total amount of the second solution, (120 mmole/L) was supplied into the digester and the remnant 25% into the struvite reactor. After one month since the start of the experiment, the analyzed results of the following week are shown in the table 7 below as 'after supplementation of the first solution into digester'.

TABLE 7

| Items | raw waste-water | Before Supplementation of the first solution into Digester | | After Supplementation of the first solution into Digester | |
|---|---|---|---|---|---|
| | | After Anaerobic Treatment | After Separation of Crystals | After Anaerobic Treatment | After Separation of Crystals |
| CODcr[mg/L] | 51,000 | 14,000 | 10,200 | 14,200 | 10,200 |
| T-N[mg/L] | 1,800 | 1,460 | 1,130 | 1,460 | 670 |
| $NH_4$—N[mg/L] | 250 | 890 | 814 | 890 | 145 |
| $PO_4$—P[mg/L] | 256 | 250 | 2.1 | 2,500 | 1.8 |

With the struvite manufacturing methods of the related art that do not involve the supplementation of phosphorus-containing the first solution, the nitrogen removal is stopped when the phosphate is depleted, even if there is an excessive amount of magnesium ion. Supplying phosphorus phosphate-supplying the first solution into the digester, however, the ammonium nitrogen concentration of the treated water is decreased to a 145 mg/L with additional removal of 669 mg/L. Also, the production of struvite is increased by approximately 10 folds from 1.0 g/d to 11 g/d and 80.6 mmole/L of phosphorus phosphate was eliminated while 1.8 mg/L remained. In other words, the possibility of mass-producing struvite while eliminating about 745 mg/L of ammonium nitrogen was verified. The trial of injecting the first solution after the anaerobic treatment was not attempted due to the excessive amount of alkaline solution required of this.

Example 8

After completing the experiment of Example 7, an experiment comparing the struvite formation with and without elimination of SS was executed while maintaining the same conditions of the experiment of Example 7. The experiment was done by introducing the SS removed water into the struvite facility while supplying NaOH and magnesium.

TABLE 8

| Items | Before Anaerobic Treatment | Without Elimination of Suspended solids | | After Elimination of Suspended solids | |
|---|---|---|---|---|---|
| | | After Anaerobic Treatment | After Separation of Crystals | After Anaerobic Treatment | After Separation of Crystals |
| CODcr[mg/L] | 51,000 | 13,900 | 10,200 | 13,900 | 8,012 |
| T-N[mg/L] | 1,800 | 1,450 | 670 | 1,450 | 778 |
| $NH_4$—N[mg/L] | 250 | 890 | 145 | 894 | 245 |
| $PO_4$—P[mg/L] | 256 | 2,500 | 1.8 | 2,558 | 0.9 |

Although the elimination rate of ammonium nitrogen was slightly decreased by leaving extra 100 mg/L (most likely due to the chemicals used for removal of phosphorus phosphate) there were no significant difficulties in either the nitrogen removal rate or the struvite formation rate. An improvement in the method of chemical treatment or the usage of a SS separation method that does not require chemical treatment could reduce this minimal decrease in the elimination rate of nitrogen. Therefore, the method of removing SS before or after anaerobic treatment can be regarded as a possible process in the elimination of nitrogen and formation of struvite.

Example 9

After completing the experiment of Example 7, the possibility of using a new calcium/phosphorus-containing the first solution (4 kg of pig bones were dissolved in 20 L of acetic acid with a pH of 2.3 for 15 days) instead of the phosphate solution was explored. After analyzing and confirming the phosphorus phosphate and calcium content of the new calcium/phosphorus-containing the first solution, the supply rate of calcium/phosphorus-containing the first solution was maintained as 0.4 L/d in order to provide the same amount of phosphorus phosphate with Example 7. After one month since the start of the operation, the analyzed results of the following week are shown in the table 9 below as 'after supplementation of dissolved bone the first solution'.

TABLE 9

| Items | Before Anaerobic Treatment | Before Supplementation of Dissolved Bone the first solution | | After Supplementation of Dissolved Bone the first solution | |
|---|---|---|---|---|---|
| | | After Anaerobic Treatment | After Separation of Crystals | After Anaerobic Treatment | After Separation of Crystals |
| CODcr[mg/L] | 51,000 | 14,200 | 10,200 | 13,900 | 9,099 |
| T-N[mg/L] | 1,800 | 1,460 | 670 | 1,450 | 890 |
| $NH_4$—N[mg/L] | 250 | 890 | 145 | 890 | 390 |
| $PO_4$—P[mg/L] | 256 | 2,500 | 1.8 | 2,489 | 820 |

Even though the same amount of phosphate was supplied, because there was insufficient magnesium or calcium in the dissolved bone the first solution, the removal of ammonia was not as good as Example 7. The ammonium nitrogen concentration was 390 mg/L and the concentration of the remnant phosphorus phosphate was 820 mg/L. That is to say, although inadequate, it is possible to use the dissolved bone the first solution, which supplies both phosphorus phosphate and calcium, for manufacturing calcium-based struvite and efficiently removing nitrogen.

Example 10

After completing the experiment of Example 9, a new version of calcium/phosphorus-containing the first solution was prepared by dissolving 4 kg of pig bones and 2 kg of oyster shells in 20 L of acetic acid with a pH of 2.3 for 15 days and analyzed to check the increase in calcium content. In order to provide the same amount of phosphorus phosphate, this new the first solution was supplied at a rate of 0.42 L/d with raw wastewater into the anaerobic reactor. After one month since the start of the operation, the analyzed results of the following week are shown in the table 10 below as 'after supplementation of dissolved bone/shellfish cover the first solution'.

TABLE 10

| Items | Before Anaerobic Treatment | Before Supplementation of Dissolved Bone/ Shellfish cover the first solution | | After Supplementation of Dissolved Bone/ Shellfish cover the first solution | |
|---|---|---|---|---|---|
| | | After Anaerobic Treatment | After Separation of Crystals | After Anaerobic Treatment | After Separation of Crystals |
| CODcr[mg/L] | 51,000 | 14,200 | 10,200 | 13,900 | 11,000 |
| T-N[mg/L] | 1,800 | 1,460 | 890 | 1,450 | 590 |
| $NH_4$—N[mg/L] | 250 | 890 | 390 | 890 | 136 |
| $PO_4$—P[mg/L] | 256 | 2,500 | 820 | 2,489 | 1.5 |

With the usage of the first solution which supplies the same amount of phosphorus phosphate with additional calcium, a nearly complete removal of ammonia was possible. As a result, the ammonium nitrogen concentration was 136 mg/L and the phosphorus phosphate concentration was 1.5 mg/L. In other words, the application of the first solution, which supplies the same amount of phosphorus phosphate with additional calcium, produced from dissolving bone and shellfish cover in acid can be efficient. After completing the above-mentioned experiment, the phosphorus phosphate and calcium from a solution produced by boiling a mixture of 20 L of water, 4 kg of pig bones, and 2 kg of oyster shells for a day was analyzed. It was verified to have a considerable amount of phosphorus phosphate and calcium. The conclusion that solution with dissolved animal bones and shellfish cover in water could be also used alike the first solution dissolved in acid was reached.

Therefore, by using the method of the present invention when treating nitrogen-rich wastewater, such as livestock waste, landfill leachate, food waste, leachate of food waste, and particular industrial wastewaters such as distillery wastewater, pharmaceutical wastewater, brewery wastewater, etc., with an ammonium nitrogen concentration of more than 2,500 mg/L, it is possible to remove ammonium nitrogen and prevent the toxic effect of ammonia by re-circulating the ammonium nitrogen-ridden treated water into the anaerobic reactor; all the while, producing increased amounts of biogas and mass-producing struvite. In other words, further advantages of the present invention are the additional production of struvite and extra-removal of nitrogen.

What is claimed is:

1. A method of treating nitrogen-rich wastewater and producing struvite, comprising the steps of:
   (a) anaerobic treatment step treating the wastewater and a first solution containing phosphorus ion with anaerobic microorganisms in anaerobic reactor; and
   (b) struvite formation step introducing the treated wastewater of step (a) into a struvite reactor and producing struvite.

2. The method according to claim 1, wherein the method further comprises the addition of second solution containing at least one alkali metal-containing solution selected from the group consisting of magnesium-containing solution, calcium-containing solution, and a mixture thereof, into step (a) or (b).

3. The method according to claim 2, wherein the second solution is added to the anaerobic reactor of step (a) in alone or a mixture with the first solution containing phosphorus ion.

4. The method according to claim 2, wherein the second solution is added to the struvite reactor of step (b).

5. The method according to claim 2, wherein the second solution is added with the treated wastewater of step (a) into the struvite reactor of step (b).

6. The method according to claim 2, wherein the calcium-containing solution is produced from Shellfish cover dissolved in acid.

7. The method according to claim 1, further comprising a solid-liquid separation step after anaerobic treatment step and before struvite formation step.

8. The method according to claim 7, wherein the solid-liquid separation is performed by a physical method, chemical method or a combination thereof.

9. The method according to claim 1, wherein the first solution is a phosphatic aqueous solution; or a solution produced by dissolving a compound containing both phosphate and calcium selected from the group consisting of MCP (monocalcium phosphate), DCP (dicalcium phosphate), TCP (tricalcium phosphate) and animal bones with water or acid.

10. The method according to claim 9, wherein the second solution further comprises a solution produced from Shellfish cover dissolved in water or acid.

11. The method according to claim 9, wherein the acid is selected from the group consisting of nitric acid, hydrochloric acid, sulfuric acid, phosphoric acid, acetic acid, formic acid and a fermented acid of food waste.

12. The method according to claim 11, wherein the fermented acid of food waste is produced from acidification of food waste and has a pH of 1.5~5.5.

13. The method according to claim 1, wherein the first solution is produced with addition of magnesium or calcium-containing solution.

14. The method according to claim 1, wherein step (b) further comprises a step of adjusting pH to 8 or higher by adding a base.

15. The method according to claim 1, further comprising a step of removing ammonium nitrogen in the treated water obtained from step (b) and re-circulating into the anaerobic reactor.

16. The method according to claim 1, wherein the wastewater includes at least one selected from the group consisting of sewage, livestock waste, landfill leachate, food waste, leachate of food waste, sewage sludge, distillery wastewater, pharmaceutical wastewater and brewery wastewater.

17. The method according to claim 16, wherein the wastewater includes at least one selected from the group consisting of livestock waste with a total nitrogen concentration of 1500~4500 mg/L, landfill leachate with a total nitrogen concentration of 1000~4500 mg/L, leachate of food waste with a total nitrogen concentration of 2500~6500 mg/L, sewage with a total nitrogen concentration of 25~150 mg/L, and industrial wastewaters with a total nitrogen concentration of 800~2500 mg/L including distillery wastewater.

* * * * *